United States Patent
Roelleke

(10) Patent No.: US 6,453,225 B1
(45) Date of Patent: Sep. 17, 2002

(54) METHOD FOR ESTABLISHING A RELEASE CRITERION FOR RESTRAINING MEANS

(75) Inventor: Michael Roelleke, Leonberg-Hoefingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/719,877

(22) PCT Filed: Apr. 13, 2000

(86) PCT No.: PCT/DE00/01144

§ 371 (c)(1),
(2), (4) Date: Mar. 1, 2001

(87) PCT Pub. No.: WO00/63045

PCT Pub. Date: Oct. 26, 2000

(30) Foreign Application Priority Data

Apr. 20, 1999 (DE) .......................................... 199 17 710

(51) Int. Cl.$^7$ ............................ B60Q 1/00; B60R 21/32; B60R 21/12

(52) U.S. Cl. ............................ 701/45; 701/46; 280/734; 180/268

(58) Field of Search ................................ 701/45, 46, 47, 701/301; 280/734, 735, 728.1; 180/268, 271, 282; 340/436, 438, 903

(56) References Cited

U.S. PATENT DOCUMENTS

| | | | | |
|---|---|---|---|---|
| 5,164,901 A | * | 11/1992 | Blackburn et al. | 364/424.05 |
| 5,216,607 A | * | 6/1993 | Diller et al. | 364/424.05 |
| 5,436,838 A | * | 7/1995 | Miyamori | 364/424.05 |
| 5,483,449 A | * | 1/1996 | Caruso et al. | 364/424.05 |
| 5,964,817 A | * | 10/1999 | Dalum et al. | 701/45 |
| 6,175,299 B1 | * | 1/2001 | Manlove et al. | 340/436 |

\* cited by examiner

*Primary Examiner*—Tan Nguyen
*Assistant Examiner*—Dalena Tran
(74) *Attorney, Agent, or Firm*—Kenyon & Kenyon

(57) ABSTRACT

A clear distinction between deployment and nondeployment situations is made by subjecting the measured acceleration of a vehicle to low-pass filtration, forming a deployment threshold as a function of the filtered acceleration signal, analyzing an acceleration signal, as soon as it is measured, in a first time segment to determine characteristic features indicating a crash event in which the restraint device should not be deployed and reducing the cut-off frequency of the low-pass filter for a predetermined time segment if a non-deployment situation of this type is detected.

6 Claims, 5 Drawing Sheets

METHOD FOR ESTABLISHING A RELEASE CRITERION FOR RESTRAINING MEANS

FIELD OF THE INVENTION

The present invention relates to a method for forming a deployment criterion for means of restraint in a vehicle, where the vehicle acceleration in at least one direction is measured, the measured acceleration is integrated, the integrated acceleration is compared to a threshold that assumes a high value at low accelerations and a low value at high accelerations, and an exceeding of the threshold by the integrated acceleration is used as the deployment criterion.

BACKGROUND INFORMATION

A method of this type for forming a deployment criterion, for means of restraint is known from European Patent No. 458796. In the deployment algorithm described in this publication, the level of the threshold depends on the measured acceleration. Selecting a suitable threshold makes it possible to distinguish between deployment and nondeployment situations. Indeed, the deployment of means of restraint (airbags or seatbelt tensioners) should be prevented when the vehicle is involved in only a minor crash or, for example, when driving over railroad ties or the edge of a curb, thus preventing any risk of injury to the vehicle occupants. In the case of serious crashes, on the other hand, in which there is always a risk of injury to the vehicle occupants, nothing should prevent the means of restraint from deploying. Because there is often only a very narrow margin between crashes that require deployment of the means of restraint and those in which such deployment should be prevented, it is entirely possible that the wrong decision is made as to whether or not the means of restraint should be deployed.

The object of the present invention is therefore to provide a method forming a deployment criterion as reliably as possible that clearly distinguishes between nondeployment and deployment situations.

SUMMARY OF THE INVENTION

The object mentioned above is achieved in that the measured acceleration is subjected to low-pass filtration; the deployment threshold is formed as a function of the filtered acceleration signal. An acceleration signal is analyzed, as soon as it has been measured, in a first time segment to determine characteristic features indicating a crash event in which the means of restraint should not be deployed; and the cut-off frequency of the low-pass filter is reduced for a predetermined time segment if a nondeployment situation of this type is detected. Analyzing a measured acceleration signal in the beginning to determine whether features of a nondeployment crash are present, and influencing the deployment threshold accordingly, produces a much more accurate deployment criterion, which clearly distinguishes between deployment and nondeployment situations.

If a nondeployment crash were erroneously detected, although a serious crash requiring unconditional deployment of the means of restraint did indeed occur, the crash signals would be only slightly influenced by the brief reduction in the cut-off frequency of the low-pass filter.

It is expedient that the integration of the measured acceleration does not begin until the acceleration signal exceeds a predetermined signal level. Thus, very slight vehicle accelerations lying below a noise threshold are initially completely ignored when forming the deployment criterion.

The low-pass filter can preferably be an IIR or FIR filter whose parameters are varied upon detecting a nondeployment situation so that the filter cut-off frequency is reduced.

To detect nondeployment situations, the measured acceleration signal is advantageously integrated across multiple consecutive, short time windows in the first time segment, the acceleration signal integrated in this manner is then subjected to a threshold value decision, and a nondeployment situation is determined if the integrated acceleration signal initially drops below a lower threshold due to a vehicle deceleration and subsequently exceeds an upper threshold due to elastic vibrations in the vehicle body.

DETAILED DESCRIPTION

Figure 1:
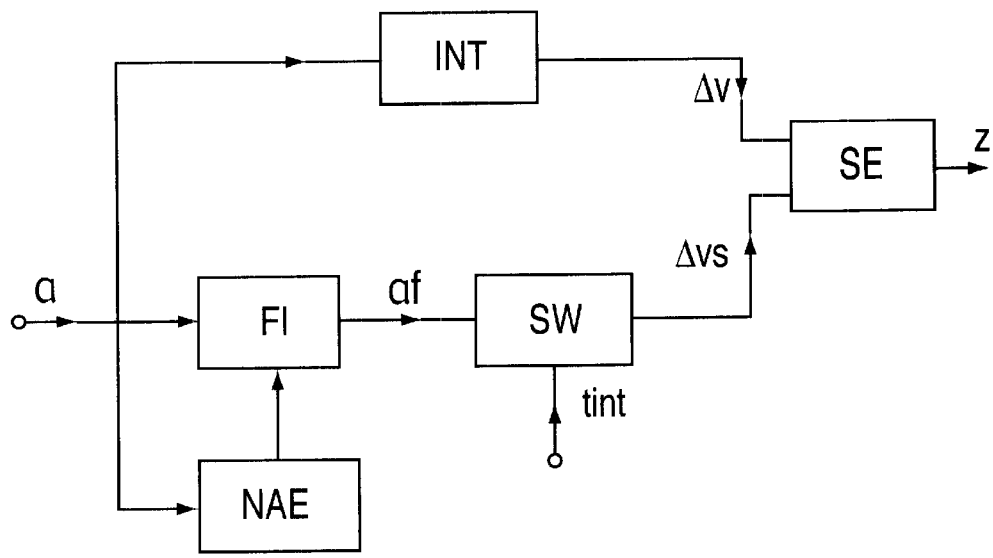
FIG. 1 shows a block diagram illustrating the derivation of a deployment criterion according to an embodiment of the present invention.
Figure 2A:
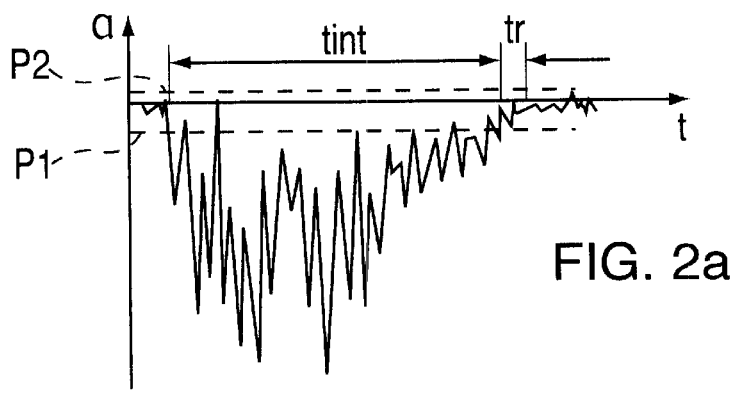
FIGS. 2a and 2b show a measured acceleration signal and the integral of this acceleration signal.
Figure 2B:
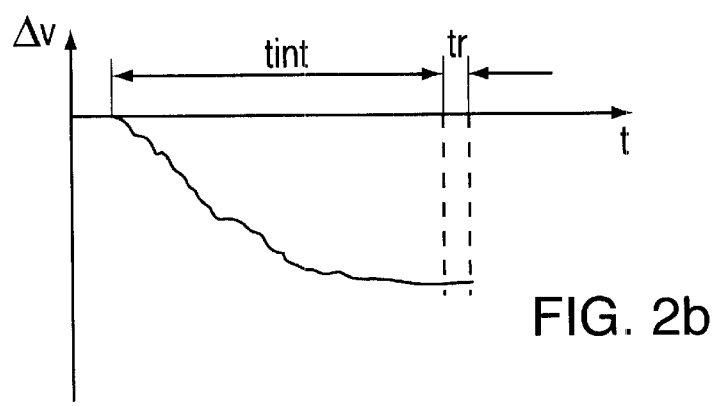

As illustrated by the block diagram in FIG. 1, an acceleration a measured in the vehicle, preferably an acceleration in the direction of its longitudinal axis, is supplied to an integrator INT. FIG. 2a shows an example of a variation in a measured acceleration a. The integration of acceleration a does not begin immediately upon the appearance of the acceleration signal, but rather only after acceleration signal a has reached a certain signal level. For this purpose, a level range is defined by two thresholds P1 and P2, and integration does not begin as long as the acceleration signal remains within this level range, since this acceleration signal would be much too small to deploy restraints. As indicated in FIG. 2a, integration time tint begins as soon as acceleration signal a exceeds threshold P1. Integration continues until acceleration signal a has returned to the level range between P1 and P2 for a period tr. The result of integrating acceleration signal a is a change in speed $\Delta v$, as shown in FIG. 2b. Within integration time tint, output signal $\Delta v$ of integrator INT increases from 0 to a final value achieved at the end of integration time tint. Speed change signal $\Delta v$ output by integrator INT is supplied to a threshold value decider SE, which compares signal $\Delta v$ to a deployment threshold $\Delta vs$. The deployment criterion for restraints in the vehicle is established by speed change signal $\Delta v$ exceeding deployment threshold $\Delta vs$. If the signal exceeds the threshold value, deployment signal z appears at the output of threshold value decider SE.

Figure 3:
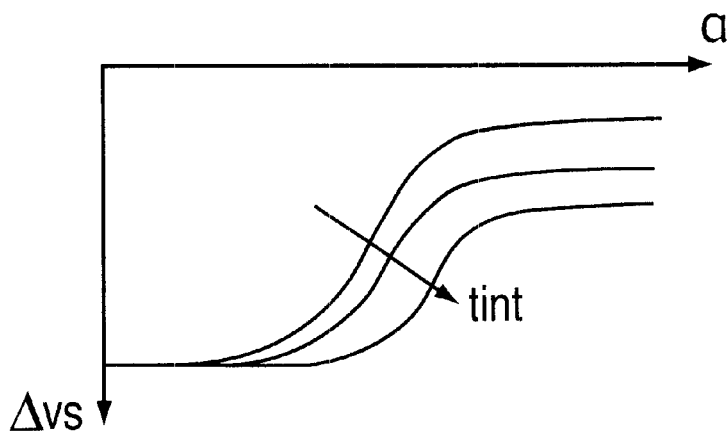
FIG. 3 shows the dependency of the deployment threshold on acceleration.
Figure 4A:
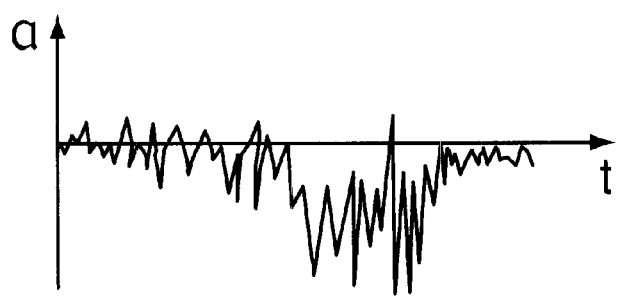
FIGS. 4a and 4b show a measured acceleration signal and a variation in the deployment threshold assigned to this signal.
Figure 4B:
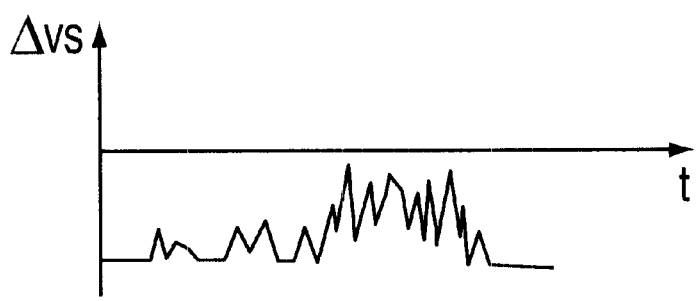

The way in which deployment threshold $\Delta vs$ is determined is explained below. Deployment threshold $\Delta vs$ is formed in a block SW. As shown in FIG. 3, deployment threshold $\Delta vs$ has a variation dependent on vehicle acceleration. Indeed, deployment threshold $\Delta vs$ has a high value at a low acceleration a and a low value at a high acceleration a. This ensures that high accelerations always meet the criterion for deployment. Low accelerations, on the other hand, should never cause deployment threshold Δvs to be exceeded, which is also prevented by a high deployment threshold Δvs at low accelerations a. The precise variation in deployment threshold Δvs is derived empirically from a large number of crash trials and optimized accordingly. As shown in FIG. 3, the level of deployment threshold Δvs is also dependent on integration time tint. As integration time tint of acceleration a increases, deployment threshold Δvs decreases to a lesser extent from a high value to a low one along with the rise in acceleration a. The example illustrated in FIGS. 4a and 4b shows how, in the case of a measured acceleration a (FIG. 4a), a deployment threshold Δvs assigned thereto (FIG. 4b) varies over time t. FIG. 4b demonstrates that deployment threshold Δvs assumes a high value at low accelerations a and a low value at high accelerations a.

Figure 5:
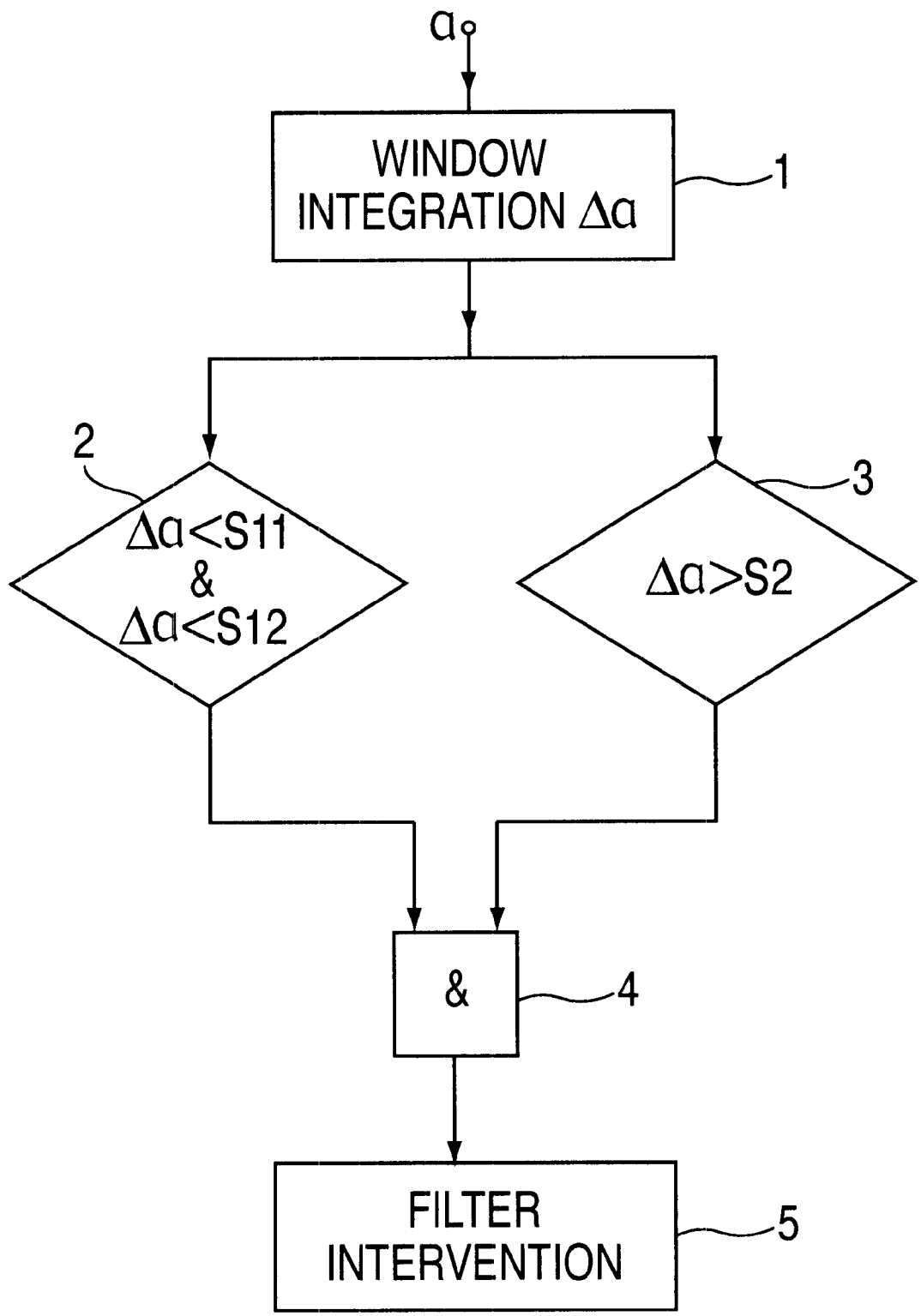
FIG. 5 shows a flowchart for detecting a nondeployment crash according to an embodiment of the present invention.
Figure 6A:
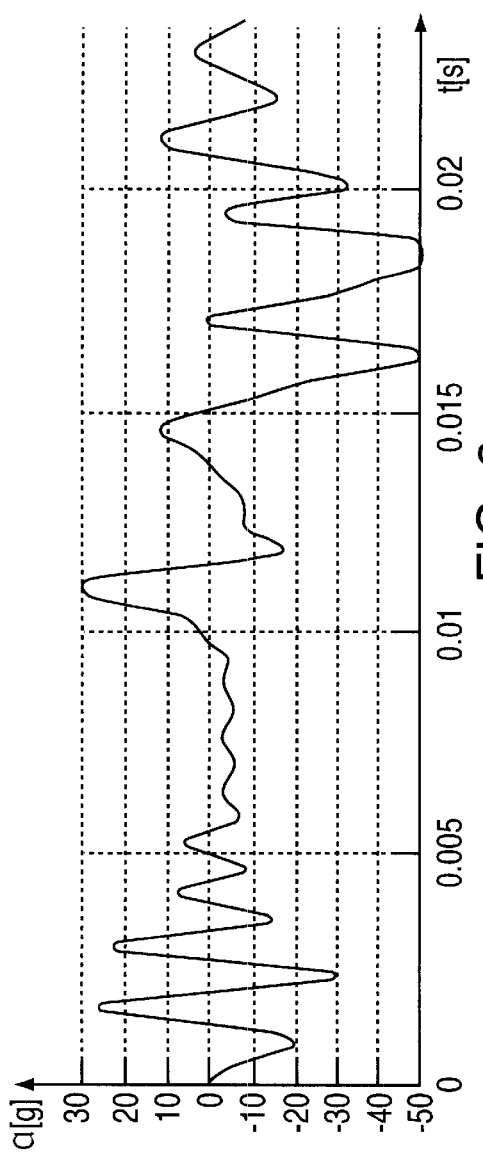
FIGS. 6a and 6b show a measured acceleration signal and its variation following window integration.
Figure 6B:
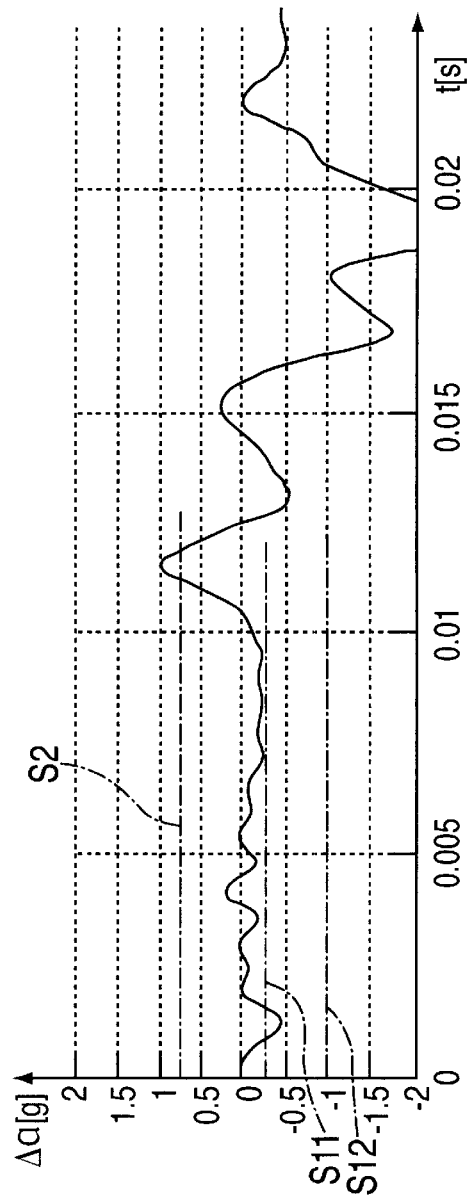

Block NAE in FIG. 1 analyzes acceleration signal a in a first time segment, lasting approximately 10 to 15 ms, starting at the beginning of acceleration signal a. During this first time segment, acceleration signal a is analyzed to determine characteristic features indicating that a nondeployment crash has occurred. FIG. 5 shows a flowchart that illustrates the procedure for analyzing acceleration signal a. In a first step 1, measured acceleration signal a is subjected to a window integration. This means that measured acceleration signal a is divided into multiple consecutive time segments and integrated in each time segment. In practice, a time window lasting approximately 1.5 ms is formed for this purpose and is successively shifted over the first time segment mentioned above, with the measured values of acceleration a determined by the time window being integrated in each new time window position. The example shown in FIGS. 6a and 6b illustrates this procedure. FIG. 6a shows an example of a variation in an acceleration signal a. The values plotted on the ordinate axis refer to multiples of ground acceleration g. FIG. 6b shows acceleration signal Δa following the above-described window integration of measured acceleration signal a. Due to this window integration, striking signal levels of measured acceleration signal a become much more prominent. In the case of nondeployment crashes, a sharper deceleration occurs at the beginning of the acceleration signal, followed by a number of higher acceleration levels, due to elastic vibrations in the vehicle body. These characteristic nondeployment crashes include slow crashes occurring at a vehicle speed of <20 km/h, or driving into gravel heaps or driving over curbs or crossing railway ties, and the like. Slow crashes at a vehicle speed below 20 km/h are often elastically absorbed by the front-end structure of the vehicle body without any significant breaks forming. One or more pronounced deceleration peaks thus occur in the beginning, followed immediately by acceleration components that reflect the elastic behavior of the vehicle body.

The described signal levels of window-integrated acceleration signal ha are detected by threshold value decisions in steps 2 and 3. In process step 2, window-integrated acceleration signal Δa is compared to a first lower threshold S11 and, if the level of Δa drops below this threshold S11, this indicates a sharper vehicle deceleration at the beginning of the crash. Signal Δa must also be compared to a second lower threshold S12, which is even lower than first lower threshold S11. In the case of a deployment crash, therefore, the vehicle decelerates so sharply that signal Δa drops below bottom threshold S12. In the case of a nondeployment crash, signal Δa always drops below first lower threshold S11, but not second lower threshold S12. In this manner, comparing signal Δa to both lower thresholds S11 and S12 makes it possible to distinguish between nondeployment and deployment crashes. If window-integrated acceleration signal Δa exceeds an upper threshold S2, as indicated in process step 3, a typical elastic reverberation of the vehicle body occurs. If the AND function in process step 4 of the two threshold value decisions yields a deceleration peak at the beginning of the acceleration signal, followed by an acceleration peak, the filter intervention described below can be carried out in process step 5. In a deviation from the method described, the analysis of acceleration signal a to determine a nondeployment crash can also be carried out with other methods, such as a frequency analysis.

Filter FI mentioned above subjects measured acceleration signal a to a low-pass filtration. Deployment threshold Δvs is derived from filtered acceleration signal af in diagram block SW, as described above. The cut-off frequency of low-pass filter FI is set to yield a filter signal af for deployment crashes, with a deployment threshold Δvs, resulting in a reliable deployment decision, being formed from this filter signal in diagram block SW. However, if diagram block NAE then detects a nondeployment crash, the sensitivity of low-pass filter FI, i.e., the cut-off frequency of this filter is reduced for a specific time segment, so that resulting output signal af of filter FI produces a modified deployment characteristic in diagram block SW, which reliably prevents the means of restraint from deploying.

Figure 7A:
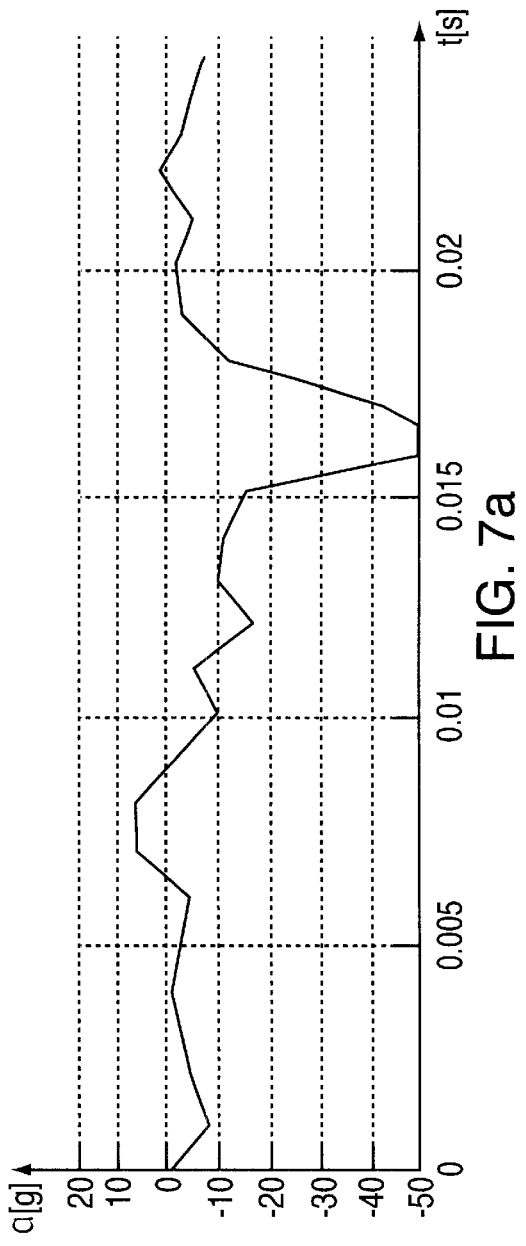
FIGS. 7a and 7b show a measured acceleration signal and its variation following filtration.
Figure 7B:
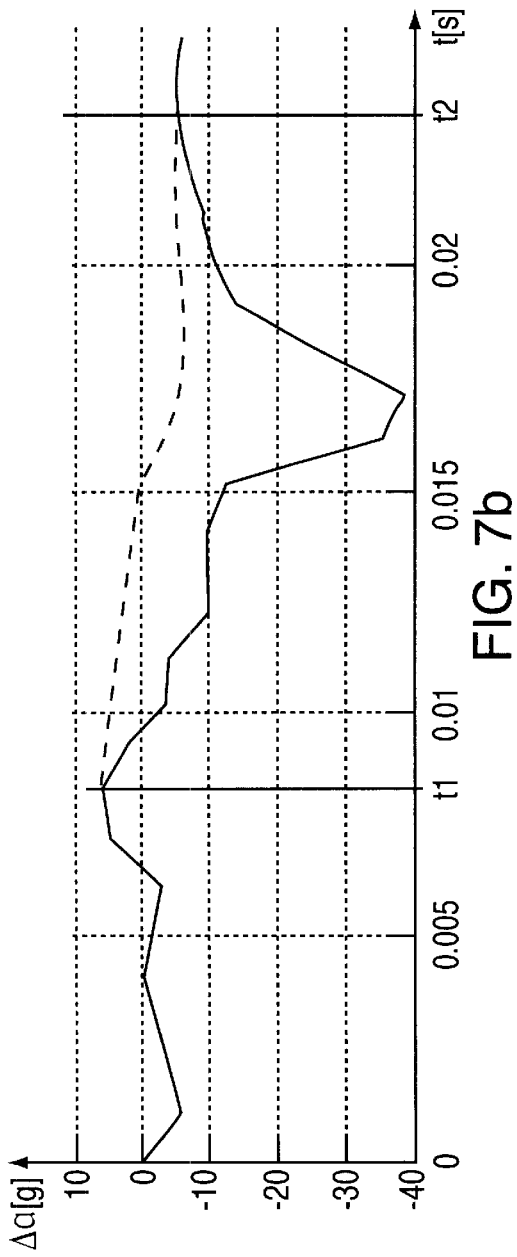

FIG. 7a shows an example of a variation in a measured acceleration a. Beneath this figure, FIG. 7b illustrates low-pass-filtered variation af in measured acceleration signal a. The solid line is low-pass-filtered acceleration signal af at an unchanged cut-off frequency. If a nondeployment crash is then detected at time t1, this reduces the cut-off frequency of low-pass filter FI, which is reflected in the variation in filter output signal af represented by the broken line. The cut-off frequency shift is maintained until a time t2, which occurs roughly 15 ms after t1. The cut-off frequency of low-pass filter FI is then returned to its original level so that any deployment crashes that occur thereafter can be reliably detected.

Low-pass filter FI is preferably an IIR (infinite impulse response) filter or an FIR (finite impulse response) filter whose filter coefficients are varied accordingly to vary the cut-off frequency in a nondeployment crash.

What is claim is:

1. A method for forming a deployment criterion for a restrainer in a vehicle, comprising the steps of:

measuring an acceleration signal of the vehicle in at least one direction;

analyzing the acceleration signal, upon measuring the acceleration signal, in a first time segment;

determining a nondeployment event based upon characteristic features indicating a crash event in which the restrainer should not be deployed;

reducing a cut-off frequency of a low-pass filter for a predetermined time segment if a nondeployment event is determined;

filtering the acceleration signal in the low-pass filter, yielding a filtered acceleration signal;

integrating the acceleration signal, yielding an integrated acceleration; and comparing the integrated acceleration to a deployment threshold, the deployment threshold having a higher value at low accelerations than at high accelerations, the deployment threshold being formed as a function of the filtered acceleration signal.

2. The method according to claim 1 wherein the step of integrating the acceleration signal does not begin until the acceleration signal exceeds a predetermined level.

3. The method according to claim, 1 wherein the low-pass filter is an infinite impulse response filter whose parameters are varied upon determining a nondeployment event so that the filter cut-off frequency is reduced.

4. The method according to claims 1, wherein the low-pass filter is a finite response filter whose parameters are varied upon detecting a nondeployment event so that the filter cut-off frequency is reduced.

5. The method according to claim 1, further comprising the steps of:

integrating the acceleration signal across multiple consecutive, short time windows in the first time segment to detect nondeployment events;

subjecting the integrated signal to a threshold value decision; and determining a nondeployment event if the integrated signal initially drops below a lower threshold due to a vehicle deceleration and subsequently exceeds an upper threshold due to elastic vibrations in a body of the vehicle.

6. The method according to claim 5, further comprising the steps of:

comparing the integrated signal to a further threshold lower than the lower threshold, the signal only dropping below the further threshold in the case of deployment crashes; and determining a nondeployment event only if the integrated signal does not drop below the further threshold.

* * * * *